Patented June 10, 1924.

1,497,251

UNITED STATES PATENT OFFICE.

EUGENE THEIMER, OF NEWARK, NEW JERSEY, ASSIGNOR, BY MESNE ASSIGNMENTS, TO ROY F. STEWARD, OF WASHINGTON, DISTRICT OF COLUMBIA.

PREPARING USEFUL DERIVATIVES OF PARAMINOPHENOL.

No Drawing. Application filed September 5, 1918, Serial No. 252,722. Renewed December 27, 1923.

*To all whom it may concern:*

Be it known that I, EUGENE THEIMER, a citizen of the United States, residing at Newark, in the county of Essex and State of New Jersey, have invented certain new and useful Improvements in Preparing Useful Derivatives of Paraminophenol; and I do hereby declare the following to be a full, clear, and exact description of the invention, such as will enable others skilled in the art to which it appertains to make and use the same.

This invention relates to methods of preparing useful derivatives of paraminophenol; and it has to do more particularly with methods of alkylating compounds such as phenacetin and the like.

A principal object of the invention is to effect alkylation of compounds of the general type referred to in a smoother and more controllable procedure than has been available heretofore; and in doing this, an alkylating agent in gaseous form is most desirably employed. Precautions are also taken to maintain the reaction mass in the form of a homogeneous liquid or solution during the alkylating treatment as contrasted with prior methods wherein products formed in a preliminary stage of the alkylating treatment separated out in crystalline or other solid form and were not in solution when treated with the alkylating agent.

With the foregoing general object in view as well as others which will appear as the description proceeds, the invention consists in the procedure which will be hereinafter described in connection with a specific illustrative example and will then be pointed out in the claims.

In practicing the present invention I employ as starting material a compound of the type represented by the formula

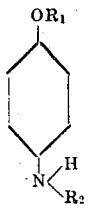

where R is an alkyl group and $R_2$ is an acidyl group.

Such compounds may be regarded as derivatives of paraminophenol. Typical compounds of this class, suitable for use in the present process are:

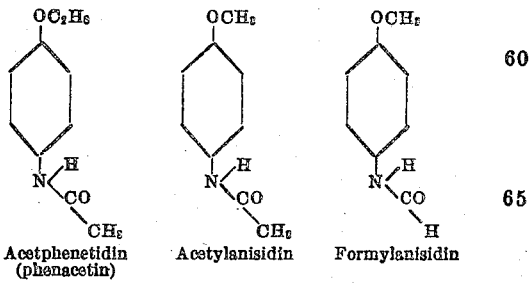

Acetphenetidin (phenacetin)    Acetylanisidin    Formylanisidin

For the purposes of the present invention, acetphenetidin, commonly known in the trade as phenacetin, is at present considered to offer special advantages as a starting material; and in further explaining the principles of the invention hereinafter, a procedure involving the use of phenacetin will therefore be described in detail for the sake of a concrete example illustrating what I now believe to be the best mode of practicing the invention.

For the sake of convenience the proportions of the various materials employed are herein given in terms of mols, it being understood that these simply represent the best reacting proportions now known to me and that said proportions may be varied within the scope of the invention while still realizing the benefits thereof in some measure.

In the specific example given for purposes of illustration, one mol of acetphenetidin, or phenacetin, is dissolved in a sufficient quantity of hot xylol, the amount of xylol most desirably being from three to four parts by weight of the phenacetin. To the liquid mass, best contained in a suitable reaction vessel provided with a reflux condenser and a stirrer, is then added about one mol of an alkali metal in available form, most desirably in the form of the free alkali metal such as metallic sodium in lumps. The reaction begins promptly, the sodium dissolving rapidly and the heat of the reaction being sufficient to maintain the reaction active until near the end when moderate external heating may usually be resorted to with advantage.

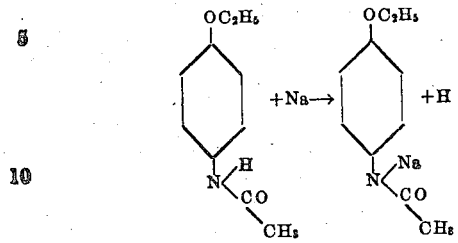

Towards the end of the reaction the liquid mixture congeals to a white mass, which does not dissolve even upon addition of more hot xylol and continued heating. This mass, which is more or less crystalline, is principally the intermediate sodium compound of phenacetin, mixed with xylol, the mass containing small particles of unchanged metallic sodium. In order to complete the reaction and also to place the mass in proper condition for subsequent treatment with a gaseous alkylating agent, methyl bromid being especially advantageous to employ, it is very desirable to have the mixture completely in liquid condition. At this stage, I therefore add to the mass a substance capable of liquefying the same. For this purpose I have found that one of the later reaction products, methyl phenacetin, acts in a peculiarly effective manner, an addition of from 10 to 20 per cent of methyl phenacetin, based on the weight of the congealed mass, being amply sufficient to bring the whole mixture into solution very rapidly, whereupon substantially all the residual metallic sodium enters into combination excepting possibly small traces which are removed by filtration at a later stage of the process.

With the liquid mixture maintained at about a boiling temperature or slightly lower, methyl bromid, which is in the form of a gas, is passed into the liquid until about one mol of the methyl bromid is taken up. In this reaction methyl phenacetin is formed with concomitant precipitation of sodium bromid.

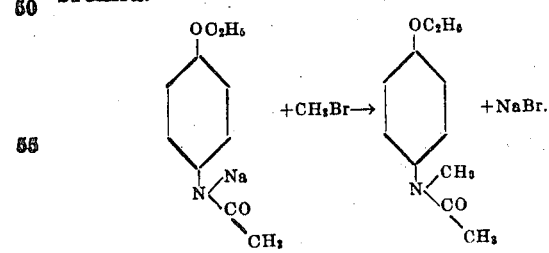

The hot solution is filtered carefully to separate the precipitated sodium bromid and also such slight traces of metallic sodium as may still remain unchanged. Special care should be exercised in this filtration to see that all traces of metallic sodium are actually removed. This is necessary in order to avoid trouble in the subsequent steam distillation of the filtrate. From the filtrate, the solvent xylol is now distilled off with steam and may be recovered in any appropriate or well known manner. The oil remaining from the steam distillation is methyl phenacetin. It may desirably be purified by distillation in vacuo.

The use of methyl bromid, in the foregoing procedure offers special advantages because by its use the methylating operation can be conducted much more smoothly and with greater ease of control than would be the case if a liquid methylating agent, such as methyl iodid, were employed. Although the speed of reaction is greater when methyl iodid is used, great care has to be exercised to add the reagent very gradually drop by drop in order to avoid violent ebullition of the reaction mixture due to the sudden transformation of liquid methyl iodid into vapor as the liquid is dropped into the hot reaction mass. This trouble is one which it is difficult to avoid under ordinary operating conditions, as a considerable proportion of the methyl iodid is volatilized upon contact with the hot reaction mass and leaves the latter unchanged, but is then caught by the reflux condenser and returned as liquid to the reaction mixture, thus again undergoing sudden and violent transformation into vapor with a repetition of the same disturbances. These difficulties are entirely overcome when methyl bromid is employed. Moreover, contrary to what would be expected, the gaseous methyl bromid is quantitatively absorbed as fast as it is introduced into the reaction mixture, notwithstanding that the latter is very hot.

Variations in detail from the specific procedure above described by way of explanatory example can evidently be practiced within the broad scope of the invention, and the appended claims are to be interpreted accordingly.

What I claim is:

1. In the preparation of useful derivatives of paraminophenol, the process which comprises converting phenacetin into the sodium compound thereof, and treating said sodium compound with gaseous methyl bromid.

2. In the preparation of useful derivatives of paraminophenol, the process which comprises treating a solution of phenacetin in an inert solvent with metallic sodium, adding methyl phenacetin to the reaction mass, and passing methyl bromid into the mixture.

3. In the preparation of useful derivatives of paraminophenol the process which comprises dissolving phenacetin in a solvent, adding metallic sodium, adding a liquefying agent to the reaction mixture, passing methyl bromid into the liquid mass, and separating resultant methyl phenacetin.

4. In the preparation of useful derivatives of paraminophenol, the process which comprises converting phenacetin into an alkali metal compound thereof, and methylating said compound while in liquid condition with a gaseous methylating agent.

5. In the preparation of useful derivatives of paraminophenol, the process which comprises converting a compound having the type formula

(where $R_1$ is an alkyl group and $R_2$ is an acidyl group) into an alkali metal derivative, and subjecting said derivative, while in liquid condition, to the action of a gaseous alkylating agent.

6. In the preparation of alkyl derivatives of phenacetin the process which comprises subjecting a liquid mixture of an alkali metal compound of phenacetin with an inert solvent and an agent preventing solidification of said alkali metal compound, to the action of a gaseous alkylating agent.

7. In the preparation of useful derivatives of paraminophenol the process which comprises passing a gaseous alkylating agent into a homogeneous liquid reaction mass comprising an alkali metal derivative of a compound having the type formula

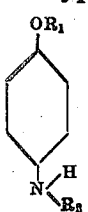

(where $R_1$ is an alkyl group and $R_2$ is an acidyl group).

8. In the preparation of methyl phenacetin, the process which comprises passing gaseous methyl bromid into a mixture comprising an alkali metal derivative of phenacetin and a liquid diluent, and separating alkali metal bromid from the resultant methyl phenacetin.

9. In the preparation of alkyl derivatives of phenacetin, the process which comprises preparing a liquid mixture comprising an alkali metal derivative of phenacetin and an alkyl derivative of phenacetin, and then subjecting said mixture to the action of an alkylating agent.

10. In the preparation of alkyl derivatives of phenacetin, the process which comprises preparing a liquid mixture comprising an alkali metal derivative of phenacetin, an alkyl derivative of phenacetin, and a diluent, and then subjecting said mixture to the action of an alkylating agent.

11. In the preparation of methyl phenacetin, the process which comprises preparing a liquid mixture comprising sodium phenacetin and methyl phenacetin, and then subjecting said mixture to the action of a methyl halid.

12. In the preparation of methyl phenacetin, the process which comprises preparing a liquid mixture comprising sodium phenacetin, methyl phenacetin, and xylol, and then subjecting said mixture to the action of methyl bromid.

13. In the preparation of alkyl derivatives of phenolic compounds the process which comprises preparing a liquid mixture comprising an alkali metal derivative of the organic compound to be alkylated and an alkyl derivative of said organic compound, and then subjecting said mixture to the action of an alkylating agent.

14. In the preparation of alkyl derivatives of compounds of the paraminophenol type, the process which comprises preparing a liquid mixture comprising an alkali metal derivative of a compound of the paraminophenol type and an alkyl derivative of said compound, and then subjecting the mixture to the action of an alkylating agent.

15. In the preparation of alkyl derivatives of organic compounds having the type formula

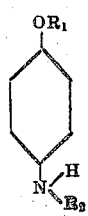

where $R_1$ is an alkyl group and $R_2$ is an acidyl group, the process which comprises preparing a liquid mixture comprising an alkali metal derivative of such an organic compound and an alkyl derivative of said organic compound, and then subjecting said mixture to the action of an alkylating agent.

16. In the preparation of alkyl derivatives of compounds of the paraminophenol type, the process which comprises preparing a liquid mixture comprising an alkali metal derivative of a compound of the paraminophenol type, an alkyl derivative of said compound, and a liquid diluent, such preparation including the step of reacting upon said compound of the paraminophenol type with a free alkali metal, subjecting said liquid mixture to the action of an alkylating agent, and separating said liquid diluent from the resultant desired alkyl derivative by steam distillation, residual particles of free alkali metal being removed from the mixture at a stage prior to such distillation.

17. The process as defined in claim 7, further characterized by the fact that said liquid reaction mass is maintained hot during passage of the gaseous alkylating agent thereinto.

18. The process as defined in claim 7, further characterized by the fact that said liquid reaction mass is maintained near its boiling temperature during passage of the gaseous alkylating agent thereinto.

In testimony whereof I hereunto affix my signature.

EUGENE THEIMER.